Sept. 29, 1953     S. C. MOON     2,653,696
LOADING MACHINE
Filed Oct. 2, 1945     9 Sheets-Sheet 4
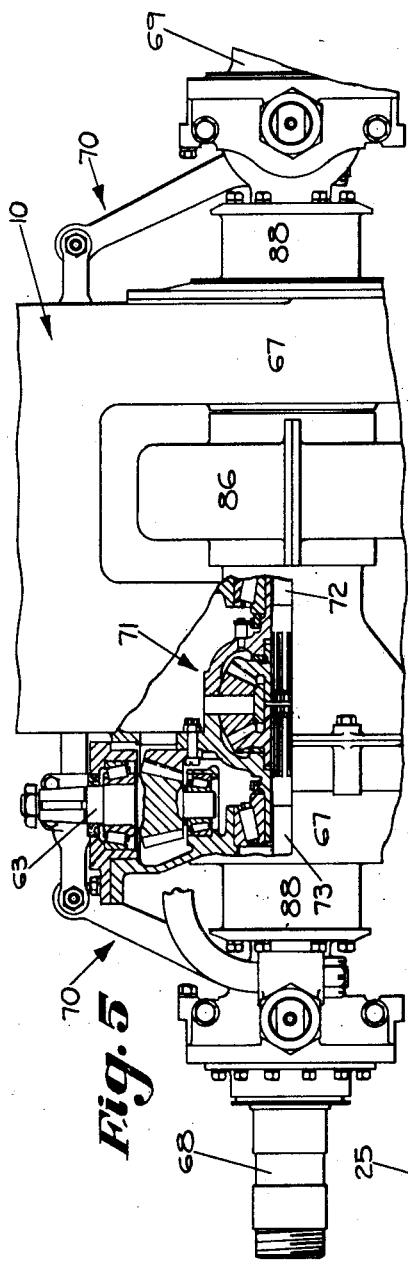
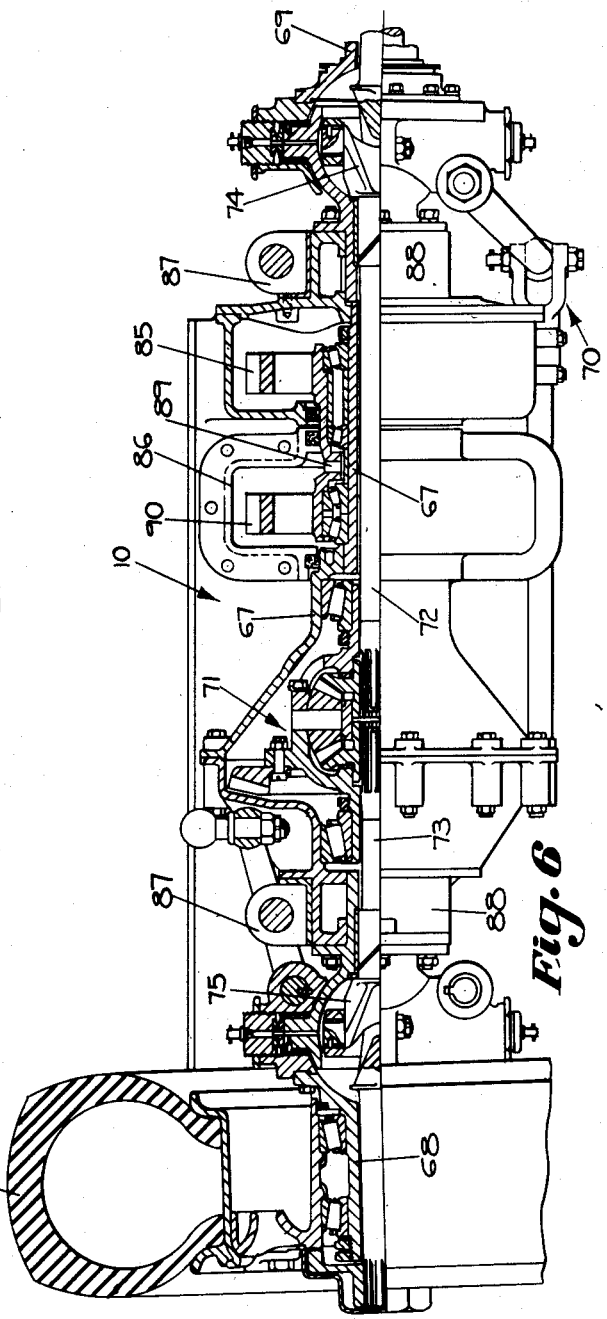
INVENTOR;
STERLING C. MOON,
BY
ATT'Y.

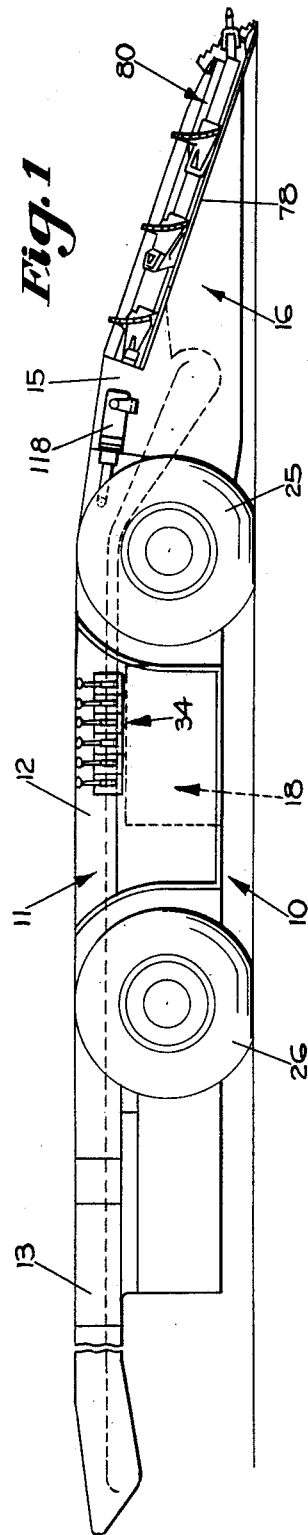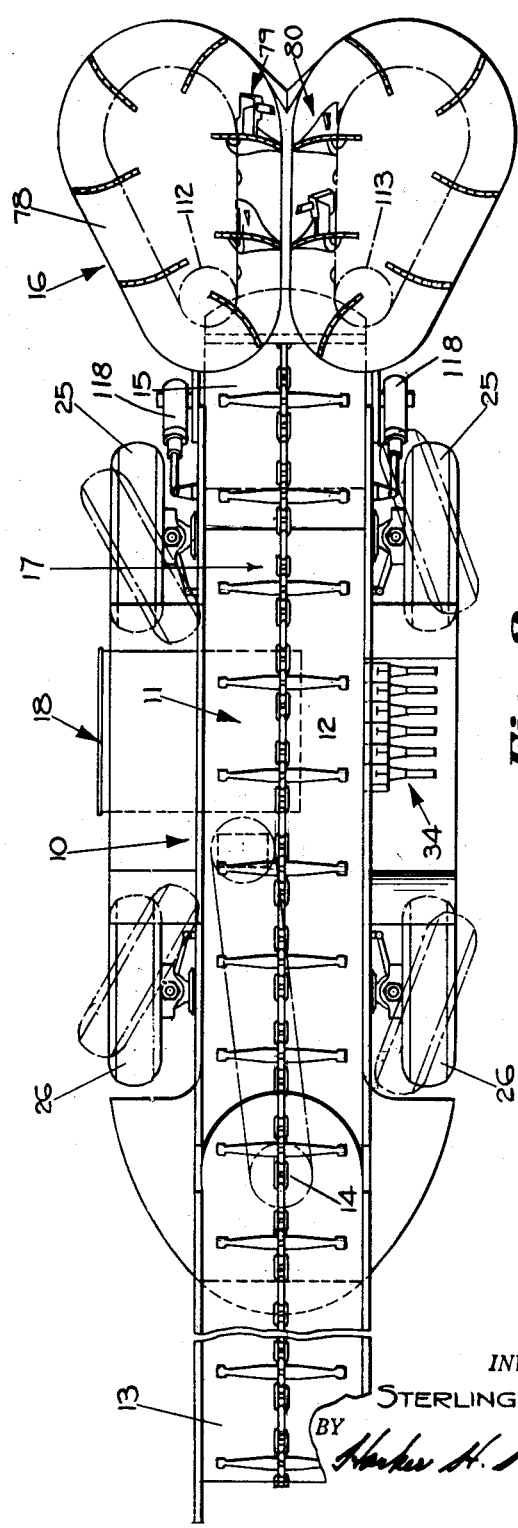

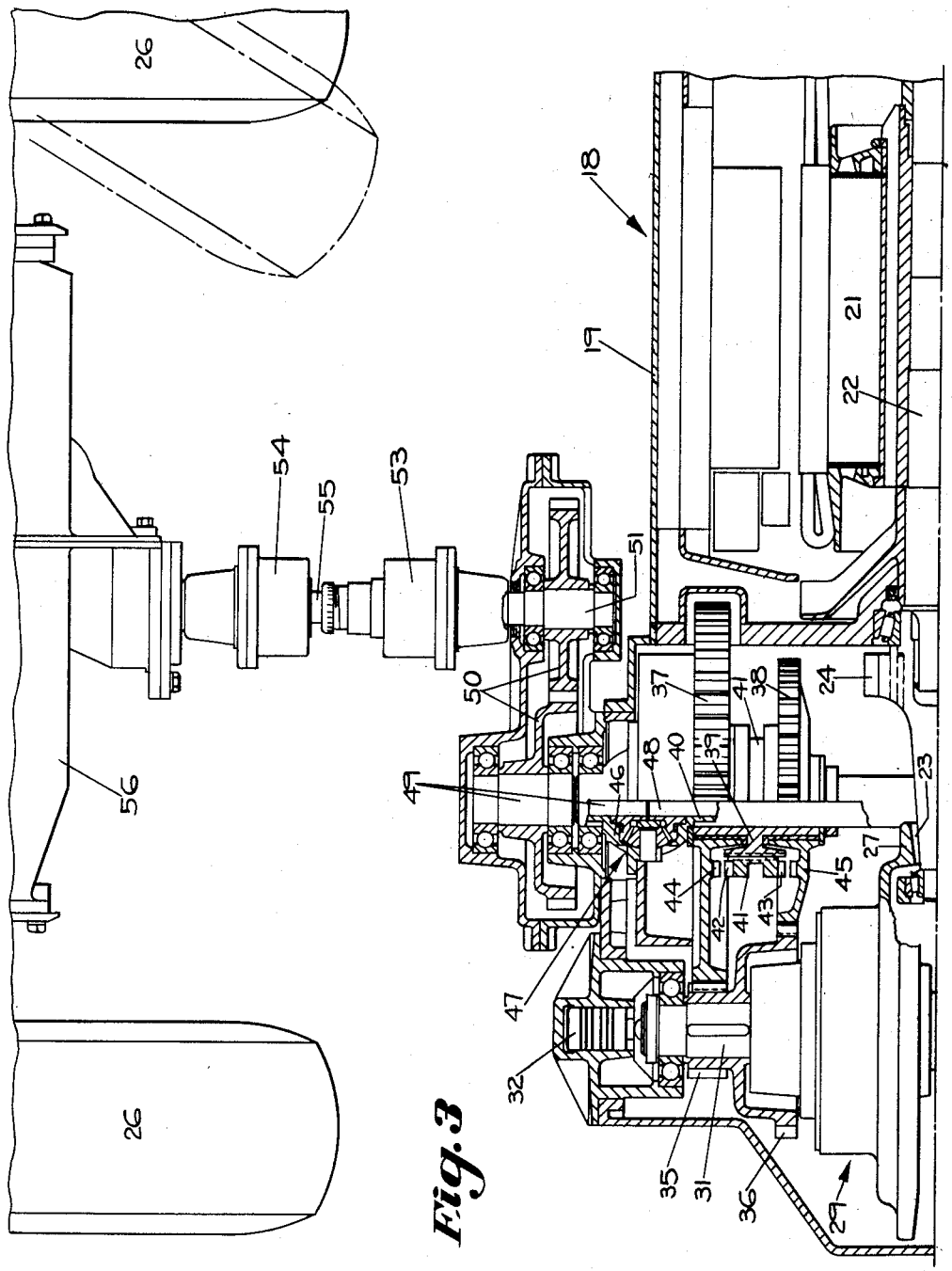

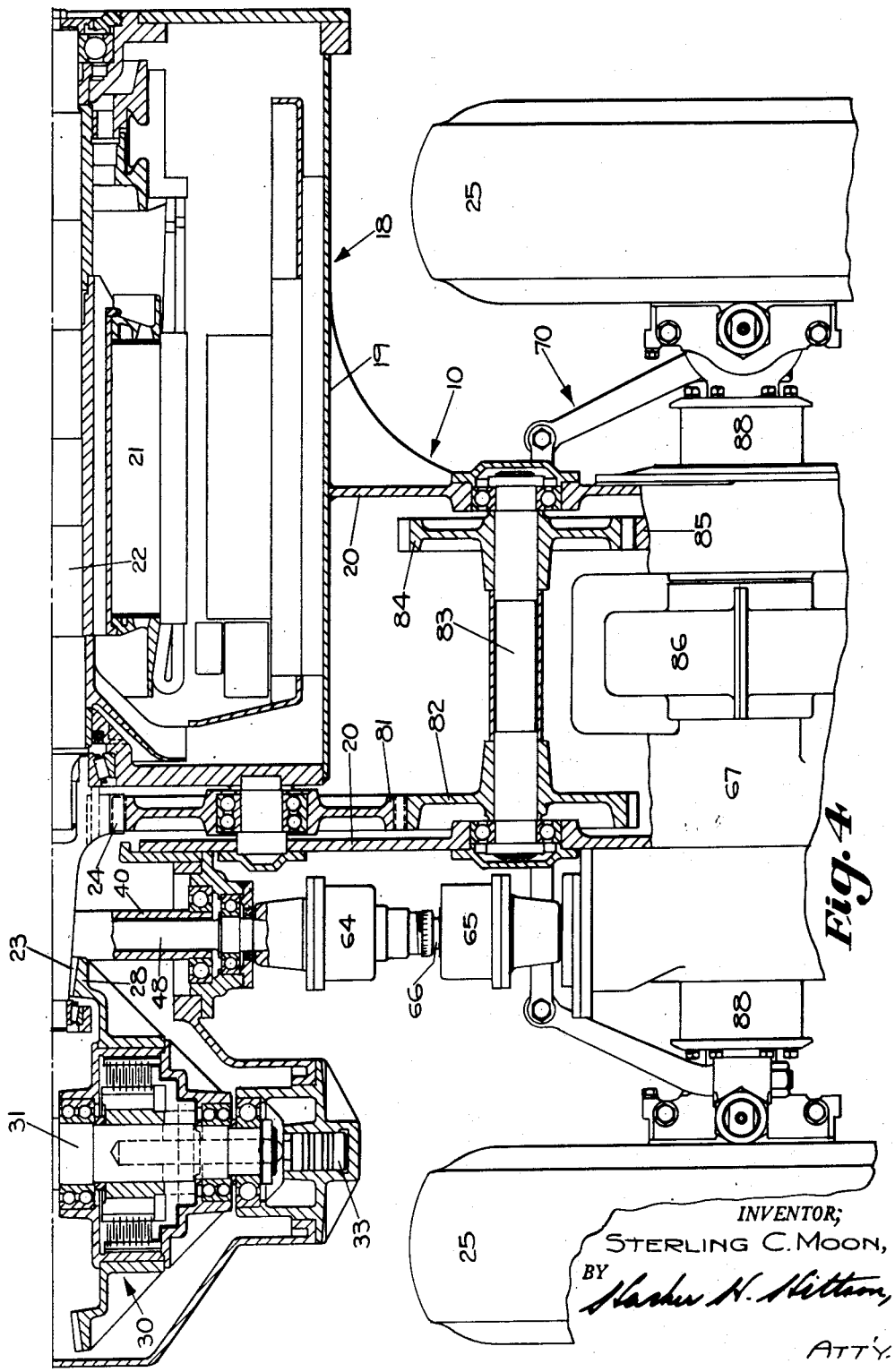

Sept. 29, 1953 S. C. MOON 2,653,696
LOADING MACHINE
Filed Oct. 2, 1945 9 Sheets-Sheet 5
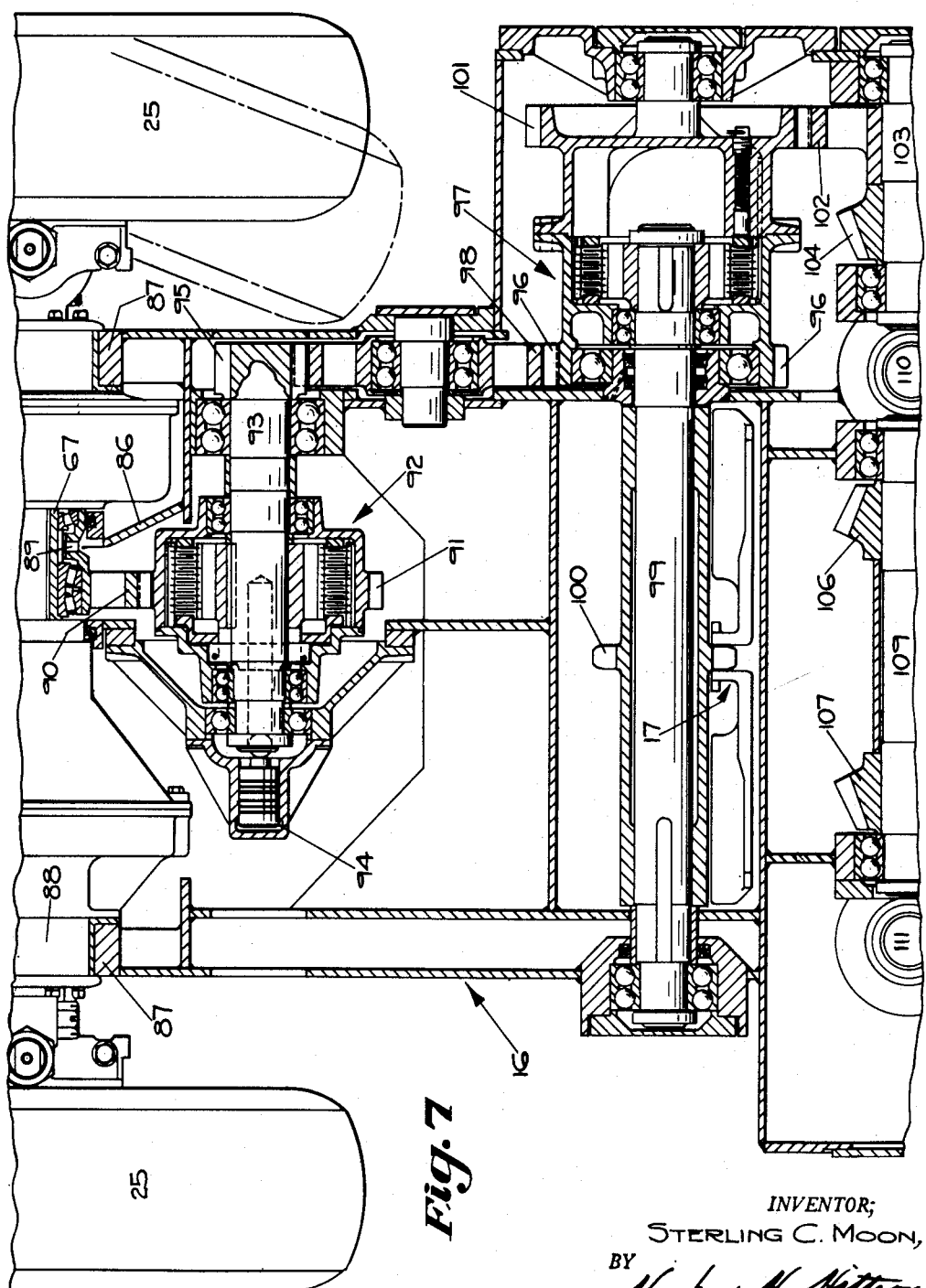
INVENTOR:
STERLING C. MOON,
BY
ATTY.

Sept. 29, 1953      S. C. MOON      2,653,696
LOADING MACHINE
Filed Oct. 2, 1945      9 Sheets-Sheet 6
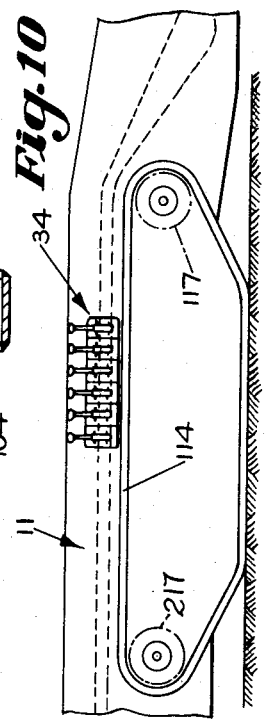
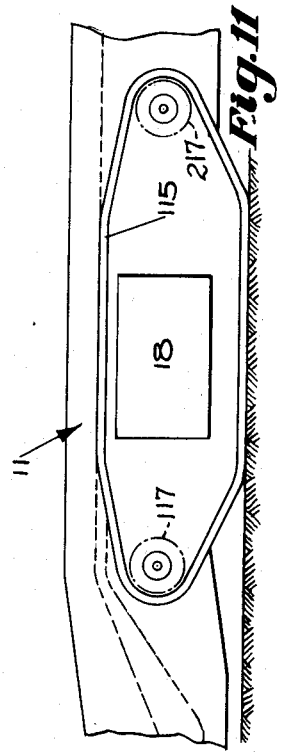
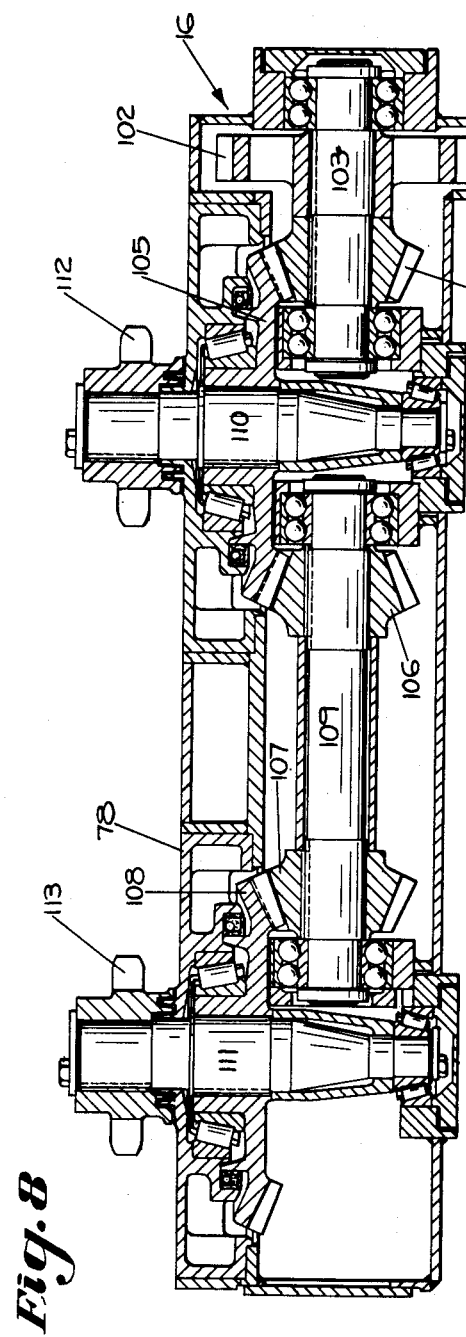
INVENTOR;
STERLING C. MOON,
BY
ATT'Y.

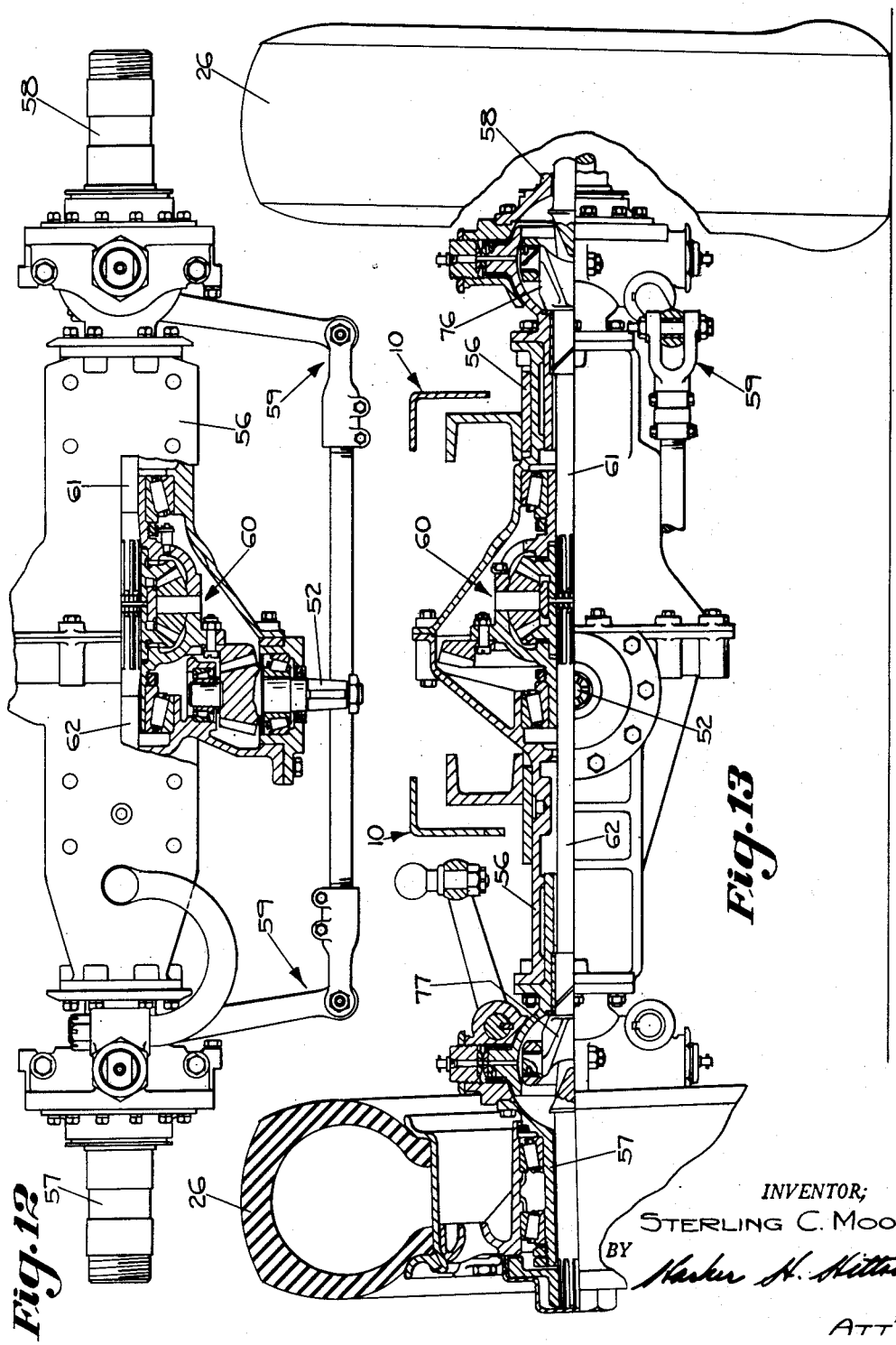

Sept. 29, 1953
S. C. MOON
2,653,696
LOADING MACHINE
Filed Oct. 2, 1945
9 Sheets-Sheet 8
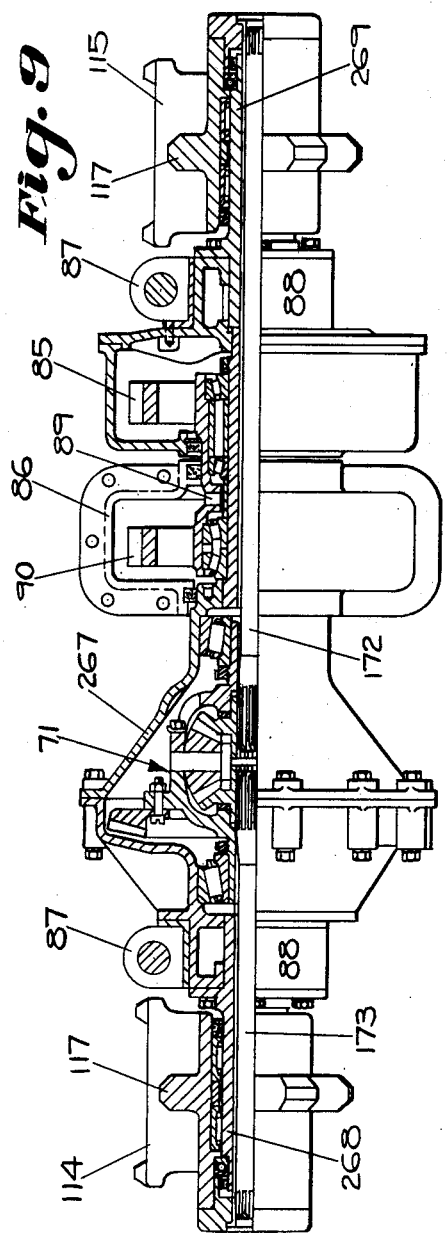
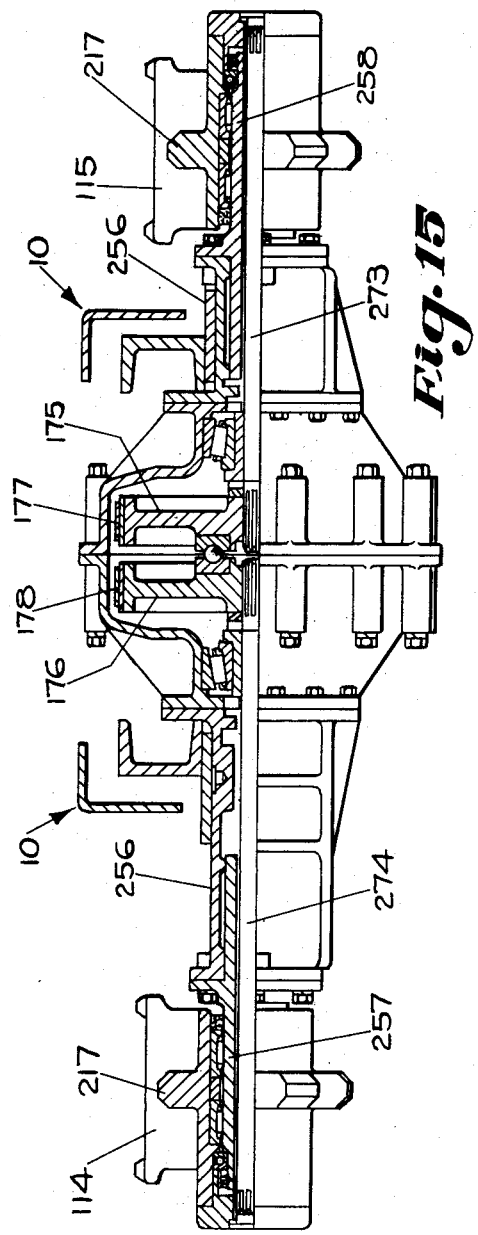
INVENTOR;
STERLING C. MOON,
BY
ATT'Y.

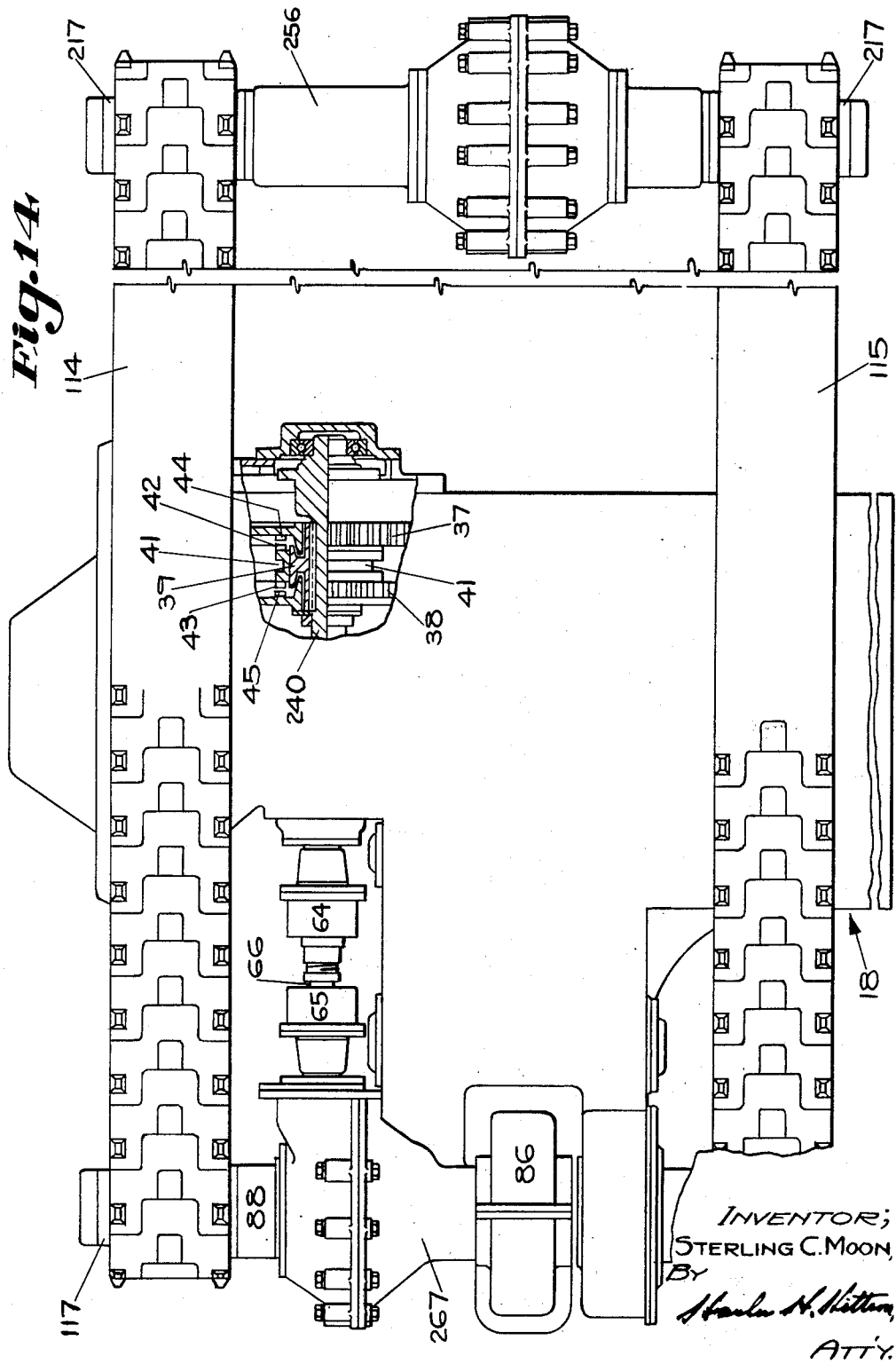

Patented Sept. 29, 1953

2,653,696

UNITED STATES PATENT OFFICE 2,653,696

LOADING MACHINE

Sterling C. Moon, Worthington, Ohio, assignor, by mesne assignments, to The Jeffrey Manufacturing Company, a corporation of Ohio Application October 2, 1945, Serial No. 619,766

8 Claims. (Cl. 198—8)

This invention relates to a loading machine particularly of the low type, i. e. the type which is particularly adapted to load coal in an underground mine room of limited height.

An object of the invention therefor is to provide an improved machine of the above mentioned type which has a high capacity, yet a very low overall height.

A further object of the invention is to provide a loading machine of the above mentioned type with improved driving and operating mechanism and preferably one in which a single primary motor is provided with direct mechanical drive means to propel the vehicle and to operate the gathering and loading conveyors thereof.

A further object of the invention is to provide a loading machine with an improved arrangement of parts which makes for a high capacity machine of low overall height and one in which a large primary driving motor is provided which is readily accessible.

Other objects of the invention will appear hereinafter, the novel features and combinations being set forth in the appended claims.

In the accompanying drawings,

Fig. 1 is a side elevational view somewhat diagrammatic in character showing a mining machine incorporating the features of my invention;

Fig. 2 is a plan view, also somewhat diagrammatic, of said machine;

Fig. 3 is an enlarged plan and sectional view showing particularly certain drive mechanism and a portion of the electric motor of said machine;

Fig. 4 is a view similar to Fig. 3 showing complementary parts and when placed side by side with Fig. 3 constitutes a continuation thereof;

Fig. 5 is an enlarged plan and sectional view of the front axle, with some of the associated gearing being shown in section;

Fig. 6 is an elevational view, with a portion in section, of the axle of Fig. 5, with one of the wheels attached;

Fig. 7 is a combination plan and sectional view showing the front axle and some of the gearing in the gathering head at the front of the vehicle; said Fig. 7 being somewhat in the nature of a continuation of Fig. 4;

Fig. 8 is a transverse sectional elevational view through the drive gearing of the gathering head;

Fig. 9 is a sectional and elevational view through an axle of a modified form of loader, in which crawlers are substituted for rubber tired wheels;

Figs. 10 and 11 are somewhat diagrammatic side elevational views of the loader, with crawlers employed instead of rubber tired wheels;

Fig. 12 is a combination plan and sectional view of the rear axle with some of the associated gearing;

Fig. 13 is a combination elevational and sectional view of the rear axle with some of the associated gearing together with the supporting wheels thereof;

Fig. 14 is a view in plan, with parts broken away, showing parts of the modified loader in which endless crawlers are substituted for the rubber tired wheels, this figure showing the axle seen in Fig. 9; and Fig. 15 is a view similar to Fig. 9, but showing the other axle mechanism of the modified loader seen in Fig. 14.

The loading machine includes a main frame 10 which constitutes the frame of a truck thereof. Mounted on the truck or main frame 10 is a conveyor frame in the form of a trough 11. The trough 11 is formed of three parts which are pivotally connected together. These three parts of the trough 11 include a central part, portion or section 12 which is rigidly attached to the main frame 10, a rear, discharge or boom section 13 which is mounted for swinging movement with respect to the central section 12 about a vertical or upright axis 14, and a front or receiving section 15 which is part of a gathering head 16 and which is mounted for pivotal movement with respect to the section 12 and the main frame 10 about a horizontal transversely extending axis, as hereinafter described more completely. The swinging means for the boom 13 (not shown) may follow that of Levin Patent 2,303,372, dated December 1, 1942. A universal type of endless conveyor chain and flight mechanism 17 is provided for the conveyor trough 11 and it travels through all three of the sections 12, 13 and 15 thereof, being driven as hereinafter described more completely.

If Figs. 3 and 4 of the drawings are placed side by side and slightly offset to align parts, a substantial portion of the drive gearing from the single driving motor will be seen in section. By reference to said Figs. 3 and 4 it will be seen that the drive for the loader includes a single large electric motor 18 which is the prime mover for all the power driven apparatus carried by the loader and, as hereinafter described more completely, except for the swinging or pivotal adjustments and the steering operation of the wheels together with the actuation of the various clutches which are hydraulically controlled, the various devices of the loader are driven by direct mechanical drives from electric motor 18. Specifically, the traction means for the loader is driven from the motor 18 by a direct mechanical gear train or gear trains.

Furthermore, the conveyor mechanism 17 is driven from the motor 18 by a direct mechanical gear train. Also gathering mechanism mounted on the gathering head 16 is driven by a mechanical gear train direct from the motor 18. As a consequence applicant employs only one electric motor and in fact only one rotary type of motor except in connection with a cable reel which is not here disclosed in detail, since it is no essential part of the invention herein claimed.

The motor 18 includes a housing or casing 19 which is an integral part of the main frame 10, being welded to a pair of spaced-apart upright plates 20 (see Fig. 4) which constitute plates of said main frame 10. Within the casing or housing 19 is a rotor 21 mounted upon a rotor or drive shaft 22. The shaft 22 is in a horizontal transverse plane relative to the axis of the main frame 10 and of the complete loader. The importance of this will be described hereinafter.

At its inner end the shaft 22 is feathered into and drives a hub provided with a pair of integral pinions or gears 23 and 24. Pinion 23 is the first gear in a pair of gear trains which ultimately lead to and drive a pair of forward and a pair of rearward combination traction and steering wheels 25 and 26, respectively. The pinion 24 is the beginning of a gear train which drives the conveyor mechanism 17 and the gathering mechanism associated with the gathering head 16.

Attention is first directed to the gear trains, beginning with the pinion 23, which drive the wheels 25 and 26. Pinion 23 is in constant mesh with ring gears 27 (Fig. 3) and 28 (Fig. 4) and since these ring gears 27 and 28 are on opposite sides of the shaft 22 they will be driven in reverse directions. Ring gear 27 is integral with the driving element of a friction clutch 29, and ring gear 28 is integral with the driving element of a friction clutch 30.

Friction clutches 29 and 30 are of similar design and they provide for the selective driving of a shaft 31 in reverse directions, depending upon which of said clutches 29 or 30 is actuated. Said clutches 29 and 30 are provided with hydraulically operated actuators or piston motors 32 and 33, respectively, which may be selectively energized by an operator under the control of hydraulic valve means indicated generally at 34 in Figs. 1 and 2 of the drawings. It is evident that by selectively controlling the clutches 29 and 30 the direction of travel of the loader may be reversed.

The reversely operable shaft 31 is provided with a pair of gears 35 and 36 (Fig. 3) which continuously mesh with gears 37 and 38, respectively, both of which are journaled for relatively free rotation on a sleeve 39 which is keyed to a hollow tube 40.

The gears 35 and 37 provide a low speed or feeding drive, and the gears 36 and 38 provide a high speed or transportation drive for the loader, and one of these gear combinations is selectively connectible to the sleeve 39 by a jaw clutch including a shiftable driven or jaw clutch member 41 which is feathered to the sleeve 39 and which has teeth or jaws 42 and 43 which may be selectively engaged with jaws 44 and 45 carried by the gears 37 and 38, respectively. Also the clutch member 41 may be held in neutral position, as illustrated in Fig. 3 of the drawings. Operator controlled mechanism is provided for shifting the clutch member 41.

The sleeve 39 therefore will drive the hollow tube 40 selectively in reverse directions and selectively at high or low speed. Tube 40 is formed integral with the cage 46 of a differential 47 which drives forwardly and rearwardly extending shafts 48 and 49, respectively, through well-known differential action. Shaft 49 is geared by a pair of laterally offset gears 50 to drive a shaft 51 which in turn is connected to a stub shaft 52 (see Figs. 12 and 13) through a pair of universal joints 53 and 54 (Fig. 3) and an interconnecting drive shaft 55.

Referring particularly to Figs. 12 and 13 of the drawings it will be seen that the shaft 52 is mounted in a rear axle or housing 56 which at opposite ends is provided with a pair of steerable axle stubs 57 and 58 which receive the above mentioned wheels 26; the wheels 26 being construed as including pneumatic tires or the equivalent which are illustrated in the drawings. The steerable stub axles 57 and 58 are essentially of standard truck construction and thus need no detailed description. It may be pointed out, however, that the two wheels 26 are steerable about upright trunnions or king pins and are interconnected by conventional steering mechanism designated generally by the reference character 59. Furthermore, the two wheels 26 are driven from the above described stub shaft 52 by conventional truck mechanism largely carried by and housed within the axle 56 and including a differential 60 and individually driven drive shafts 61 and 62 which extend from the differential 60 to individual ones of the pair of wheels 26 through universal joints 76 and 77, respectively, which provide for steering of said wheels 26.

It may be pointed out, as particularly illustrated in Figs. 1 and 2 of the drawings, that the wheels 26 are on opposite sides of the conveyor frame 11, and the maximum height of the loader is substantially equal to the height of the wheels 26. In other words, the overall height of the loader is determined by the size of the wheels 26 and thus a very low loader is provided and one which is capable of operating in low seam coal.

Attention is now directed particularly to Figs. 4, 5 and 6 of the drawings and to the drive gearing which extends from the above described shaft 48 to drive the two front wheels 25. Shaft 48 is connected to a stub shaft 63 (see Fig. 5) through a pair of universal joints 64 and 65 and an interconnecting drive shaft 66. The stub shaft 63 is mounted in a front axle or housing 67 which is formed rigid with and constitutes a part of the main frame 10. It may well be here noted that the previously described rear axle 56 may be considered as a part of the main frame 10 but is not rigidly attached to the principal portion thereof but is mounted for pivotal movement relative thereto on a longitudinal horizontal axis, as above described, to provide the necessary three-point suspension.

At opposite ends the front axle or housing 67 is provided with steerable stub axles 68 and 69 which receive the steerable wheels 25, being mounted for steering movement on more or less standard trunnions or king pins. These stub axles 68 and 69 are interconnected by conventional steering mechanism 70 and, like the aforedescribed stub axles 57 and 58 may be operated to steer the loader while at the same time providing tractive power therefor.

The wheels 25 are power driven from the aforedescribed stub shaft 63 through more or less conventional drive mechanism largely carried by and housed within axle 67 and including a differential 71 and differentially driven axle or drive shafts 72 and 73, respectively, having universal joints 74 and 75 provided therein to accommodate the steering of the wheels 25.

From the above description there are certain important facts which are evident. First of all, it is to be noted that the main driving motor 18 is located between the front axle 67 and the rear axle 56. Furthermore, it is located largely to one side of the main frame, as clearly illustrated in Figs. 2 and 4 of the drawings, and its axis or the axis of the rotor extends transversely of the main frame and of the loader. Furthermore, its overall height is such that at least a portion of it is directly below the central section 12 of the conveyor trough 11 while preserving the overall height of the trough 11 not greater than the height of the wheels 25 and 26. Still further, the motor 18 is readily accessible and its armature or rotor 21 may be readily removed by the simple expedient of removing the outside cover plate and pulling the armature laterally outwardly from the casing 19.

Furthermore, the gear trains which interconnect the driving motor 18 with the four power driven and steering wheels 25 and 26 are entirely mechanical and are devoid of hydraulic couplings involving motor driven pumps and pump driven hydraulic motors or similar electric arrangements which heretofore have been found necessary in many instances in loaders of limited overall height. In other words, the loading machine preserves the simple, efficient and inexpensive and thus highly desirable mechanical drives from the motor 18 to the traction devices which in the embodiment of Figs. 1 and 2 are pneumatic tired wheels. A similar condition prevails for the crawler driven structure which is hereinafter described more completely.

As best seen by reference to Figs. 1 and 2 of the drawings, the aforementioned gathering head 16 includes a sloping gathering plate 78 upon which is mounted a pair of endless chain and flight gathering conveyors 79 and 80, the structure of which may, for example, follow that disclosed in the patent to E. P. Corbin, No. 2,341,977, dated February 15, 1944, for an Improvement in a Loader. As well understood, the gathering conveyors 79 and 80 will gather coal which is in a loose or semi-compact mass and convey it rearwardly along a central way, delivering it to the section 15 of the trough 11 from where it will be conveyed rearwardly by the conveyor mechanism 17.

The gear train by which the conveyor mechanism 17 and the gathering conveyors 79 and 80 are driven by all mechanical gearing from the motor 18 will now be described. Referring particularly to Fig. 4 of the drawings it will be seen that the aforedescribed pinion 24 meshes with and drives a reach gear 81 which in turn meshes with and drives a gear 82 keyed to shaft 83 having a gear 84 on the other end thereof. Gear 84 meshes with and drives a gear 85 (see Figs. 4 and 6) which is mounted in bearings on the axle 67 and is concentric with the axis of said axle 67. The hub of gear 85 extends through an opening in a housing portion of the axle 67 and into a split housing 86 which is mounted for rotation on the axis of axle 67 and is rigidly attached to and forms a part of the frame of the gathering head 16.

Referring particularly to Figs. 6 and 7 of the drawings it will further be noted that the gathering head 16 includes a pair of split attaching bearings 87 by which it is attached to cylindrical bearing portions 88 of the front axle 67, thus providing for pivotal up and down movement of the gathering head 16 under the control of hydraulic piston jacks or the like 118 so that the forwardmost tip of the gathering head may be raised or lowered to accommodate the gathering of coal both from the mine room floor and from elevated positions thereabove.

The aforementioned hub of the gear 85 is provided with jaws 89 which are normally in continuous driving mesh with similar jaws on the hub of a gear 90 (Figs. 6 and 7) which is also mounted on bearings and carried by the axle 67, thus rotating about the transverse horizontal axis of said axle 67 and providing for the above described swinging movement of the gathering head 16 thereabout while effecting a driving relation from the main frame 10 to said head 16 which is essential to complete the gear train to the mechanism carried by the head 16 now to be described.

Referring particularly to Fig. 7 of the drawings, it will be seen that the gear 90 meshes with and drives an integral gear 91 formed on the housing of a friction clutch 92, the driven element of which selectively drives a shaft 93. Actuation of the clutch 92 is under the control of an actuator or hydraulic piston motor 94. Shaft 93 is provided with an integral pinion 95 which drives an integral gear 96 formed on the housing of a clutch 97 through a reach gear 98. It is obvious that the gear train from the gear 91 is all carried by the gathering head 16.

Clutch 97 is merely an overload clutch and normally is always engaged and provides a driving relation through its driving element and driven element to a transverse shaft 99 mounted in spaced bearings in the head section 16 and carrying and driving a sprocket 100 which is the drive sprocket for the previously described conveyor chain and flight mechanism 17. Shaft 99 constitutes the head shaft as well as the driving shaft for the conveyor mechanism 17.

The clutch 97 is also merely a safety clutch for the conveyor mechanism 17 so that should it become caught for any reason, said clutch will slip, even though power is applied to drive it. The control clutch 92 above described controls the operation of the conveyor mechanism 17 and also the gathering mechanisms 79 and 80 which normally always operate with the conveyor 17.

The gear train for driving the gathering conveyors 79 and 80 continues from the housing or driving element safety clutch 97 by way of integral gear 101 to gear 102 (see Figs. 7 and 8). Gear 102 is keyed to a shaft 103 to which bevel gear 104 is also keyed and which meshes with and drives bevel gear 105 which in turn meshes with and drives a bevel gear 106 and intermeshing bevel gears 107 and 108, the former being keyed with gear 106 on a shaft 109 mounted in appropriate bearings as is shaft 103. Bevel gears 105 and 108 travel in reverse directions and are keyed to and drive laterally spaced aligned upwardly extending shafts 110 and 111, respectively, provided with sprockets 112 and 113, respectively, which mesh with and drive the chains of the gathering mechanism 79 and 80, respectively.

From the above description it is to be particularly noted that the actual final drive for both the gathering conveyors 79 and 80 and the discharge conveyor 17 is by way of sprockets 112, 113 and 100, all of which are carried by the gathering head 16 and all of these final drive sprockets are mounted for swinging movement about the horizontal axis of the forward axle 67. In other words, the final drive for the conveyor mechanism 17 is contained in the forward or head shaft thereof which is carried by the gathering head 16 or by the section 15 of the trough 11, since said section 15 is formed at the rear of and on said gathering head 16. This makes for a simple drive for the conveyor 17 and avoids the necessity of any intermediate driving and guiding sprockets to be associated therewith.

In the loading machine above described the two pair of longitudinally spaced laterally aligned wheels 25 and 26 provide the traction means as well as the steering means for the loader. The gearing provided, with some small modifications, as well as the framework, is adapted to accommodate endless crawlers as a substitute for the power driven wheels 25 and 26.

In Figs. 10 and 11 of the drawings I have illustrated the loader more or less diagrammatically, with crawlers substituted for the wheels 25 and 26. It is to be noted that on one side of the vehicle I provided endless crawler 114, the upper run of which is located below the banked control valves 34. On the opposite side I provide endless crawler 115 and the upper run travels above the motor 18, the lower run, of course, being below it. In other words, motor 18 projects laterally to one side of the loader between the upper and lower runs of the endless crawler 115.

In making this substitution, certain mechanical changes are also involved which changes are readily apparent in Figs. 14, 9 and 15 of the drawings. First of all, all four wheels 25 and 26 are removed. In addition, the stub axles 57, 58 and 68, 69 seen in Figs. 13 and 6, respectively, together with the steering trunnions are removed and in their places are provided simple stub axles 257, 258 and 268, 269, respectively, seen in Figs. 15 and 9 of the drawings. Each of the stub axles 257, 258, 268 and 269 is rigidly but removably attached to the axle 256 (Fig. 15) or 267 (Fig. 9), as the case may be, which axles 256 and 267 are counterparts, in the machine as modified to include crawlers, of the axles 56 and 67, seen respectively in Figs. 13 and 6 of the drawings.

Mounted on the stub axle 268 (Fig. 9) is a drive sprocket 117 which is driven by a straight axle shaft 173 which has been substituted for the axle shaft 73 and interposed universal joint 75 which, of course, is not required for the crawlers. A similar straight axle shaft 172 replaces the previously described axle shaft 72 and interposed universal joint 74.

Thus the drive for the two crawlers 114 and 115 will be through axle shafts 172 and 173 associated with the modified front axle 267. When the crawlers are employed they will only be driven at one end through the modified axle 267 and consequently the drive gearing from motor 18 to the rear axle 256 will be eliminated, as seen in Fig. 14. This involves the elimination of all the gearing seen in Fig. 3 of the drawings that extends between the rear axle 56 and the sleeve 39.

When the crawlers are employed the sleeve 39, instead of being keyed to the tube 40 driving the differential 47, is keyed directly to a solid drive shaft 240, seen in Fig. 14, which replaces the tube 40 and shaft 48 and the shaft 240 is permanently keyed to and driven by the sleeve 39, thus effecting a drive to the gearing in front axle 267. The differential 47 together with the gears 50, their housing, shaft 51, the drive shaft 55 and the universal joints 53 and 54 will, of course, be eliminated leaving the gearing that extends to the front axle 267. When crawlers 114 and 115 are employed the rear axle 56 is modified in a manner similar to the above described modification of the front axle 67 and the front axle as modified is illustrated at 256 in Fig. 15 of the drawings.

The sprockets of front axle 256 which receive the crawlers 114 and 115 are indicated at 217 in Fig. 15 and they are comparable with sprockets 117 of Fig. 9. Sprockets 217 are driven by the crawlers 114 and 115 and they in turn drive shafts 273 and 274 similar to shafts 173 and 174, respectively. The rear axle 256 houses brake drums 175 and 176 carried respectively on shafts 273 and 274. Brake bands 177 and 178 co-operate with brake drums 175 and 176 which may be selectively actuated to effect steering of the motor by locking either of the crawlers 114 or 115 with respect to the other or by causing, through braking action and through the action of the differential 71, either of the crawlers 114 or 115 to travel at a lower rate of speed than the other.

It is thus evident that I have provided a loading machine and in certain broader aspects a truck which by slight modifications may accommodate either four power driven steering wheels or a pair of laterally spaced crawlers. Furthermore, I have provided a simple all mechanical drive for the traction means, whether in the form of rubber-tired wheels or crawlers, and have also provided full mechanical drive gearing or gear trains from a single prime mover or electric motor 18 to drive both gathering and conveying mechanism along with the all mechanical drive for the wheels or crawlers.

The arrangement of parts is such as to make for a compact machine involving a minimum of complication and yet a machine which has a very low overall height which does not exceed the height of the traction wheels when the wheel type modification is employed. The loader is very flexible in that the gathering head may be vertically adjusted on a transverse horizontal axis relative to the main frame and to the main conveyor trough, and the rear end or discharge boom of the conveyor may be swung laterally so as to discharge at any position over a wide area.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A loading machine including a main frame, means for gathering coal or the like including a gathering head pivotally mounted relative to said main frame on a transverse horizontal axis, gathering mechanism carried by said gathering head, front and rear supporting axles for said main frame, a driving motor, an all mechanical drive from said motor connected to drive said gathering mechanism, and means mounting said gathering head for pivotal movement on the front supporting axle, said drive to said gathering mechanism including a gear the axis of which is in alignment with the pivotal axis of said gathering head.

2. In a loading machine a main frame, means for supporting said frame including a transverse axle, traction means at opposite ends of said axle, a driving motor carried by said frame, all mechanical gearing interconnecting said driving motor and said traction means, a gathering mechanism frame, gathering mechanism on said gathering mechanism frame, means pivotally mounting said gathering mechanism frame on said transverse axle, and all mechanical gearing interconnecting said driving motor and said gathering mechanism including a rotary gear mounted for rotation on said axle.

3. In a loading machine, a main frame, front and rear axles for said frame, traction wheels at opposite ends of each of said axles, a driving motor located between said front and rear axles, all mechanical gearing interconnecting said driving motor and each of said wheels, gathering mechanism including a frame pivotally mounted on the front axle, all mechanical gearing interconnecting said gathering mechanism and said driving motor including a rotary gear mounted for rotation on said front axle.

4. In a loading machine a main frame, means for supporting said frame including a transverse axle, traction means at opposite ends of said axle, a driving motor carried by said frame, gearing interconnecting said driving motor and said traction means, a gathering mechanism frame, gathering mechanism on said gathering mechanism frame, means pivotally mounting said gathering mechanism frame on said transverse axle, and gearing interconnecting said driving motor and said gathering mechanism including a rotary gear mounted for rotation on said axle.

5. A four wheel drive loader including a main frame, a gathering head, gathering means on said gathering head for gathering coal, front and rear axles extending transversely of said main frame, traction wheels on said axles, axle shafts extending through said axles for driving said wheels, means pivotally mounting said gathering head to one of said axles, a single driving motor between said axles operating on an axis extending parallel thereto, all mechanical gear train means connecting said axle shafts for driving the latter, and an all mechanical gear train means connecting said single driving motor to drive said gathering means, said last named gear train means including intermeshing gears, one on said main frame, one on said one axle and another on said gathering head connected to drive said gathering means.

6. A loader including a main frame, a gathering head, gathering means on said gathering head for gathering coal, front and rear axles extending transversely of said main frame, wheel means on each of said axles, means pivotally mounting said gathering head to one of said axles, axle shaft means in said one axle for driving the wheel means thereon, a single driving motor, all mechanical gear train means connecting said single driving motor to said axle shafts for driving the latter, and an all mechanical gear train means connecting said single driving motor to drive said gathering means, said last named gear train means including intermeshing gears, one on said main frame, one on said axle and another on said gathering head connected to drive said gathering means.

7. A loader including a main frame, a gathering head, gathering means on said gathering head for gathering coal, front and rear axles extending transversely of said main frame, wheels on said axles, axle shaft means extending through one of said axles, means pivotally mounting said gathering head to one of said axles, a single driving motor between said axles operating on an axis extending parallel thereto, all mechanical gear train means connecting said single driving motor to said axle shaft means for driving the latter, and an all mechanical gear train means connecting said single driving motor to drive said gathering means, said last named gear train means including intermeshing gears, one on said main frame, one on said axle and another on said gathering head connected to drive said gathering means.

8. A loading machine including a main frame, means for gathering coal or the like including a gathering head pivotally mounted relative to said main frame on a transverse horizontal axis, gathering mechanism carried by said gathering head, front and rear supporting axles for said main frame, a driving motor between said axles operating on an axis extending transversely of said main frame, an all mechanical drive from said motor connected to drive said gathering mechanism, and means mounting said gathering head for pivotal movement on the front supporting axle, said drive to said gathering mechanism including a train of intermeshing gears, one on the main frame, one having its axis in alignment with the pivotal axis of said gathering head and another on said gathering head connected to drive the gathering mechanism.

STERLING C. MOON.

References Cited in the file of this patent

UNITED STATES PATENTS

| Number | Name | Date |
|---|---|---|
| 751,540 | McClintock | Feb. 9, 1904 |
| 1,252,167 | Pettit | Jan. 1, 1918 |
| 1,661,780 | Warhus | Mar. 6, 1928 |
| 1,713,084 | Klinkman | May 14, 1929 |
| 1,888,868 | Schroder | Nov. 22, 1932 |
| 2,002,952 | Levin | May 28, 1935 |
| 2,024,458 | Kraft | Dec. 17, 1935 |
| 2,254,104 | Joy | Aug. 26, 1941 |
| 2,334,605 | Cartlidge | Nov. 16, 1943 |
| 2,338,160 | Arentzen | Jan. 4, 1944 |
| 2,338,704 | Clarkson et al. | Jan. 11, 1944 |
| 2,341,997 | Corbin | Feb. 15, 1944 |
| 2,360,282 | Russell | Oct. 10, 1944 |
| 2,388,385 | Cartlidge | Nov. 6, 1945 |